Figure 1:
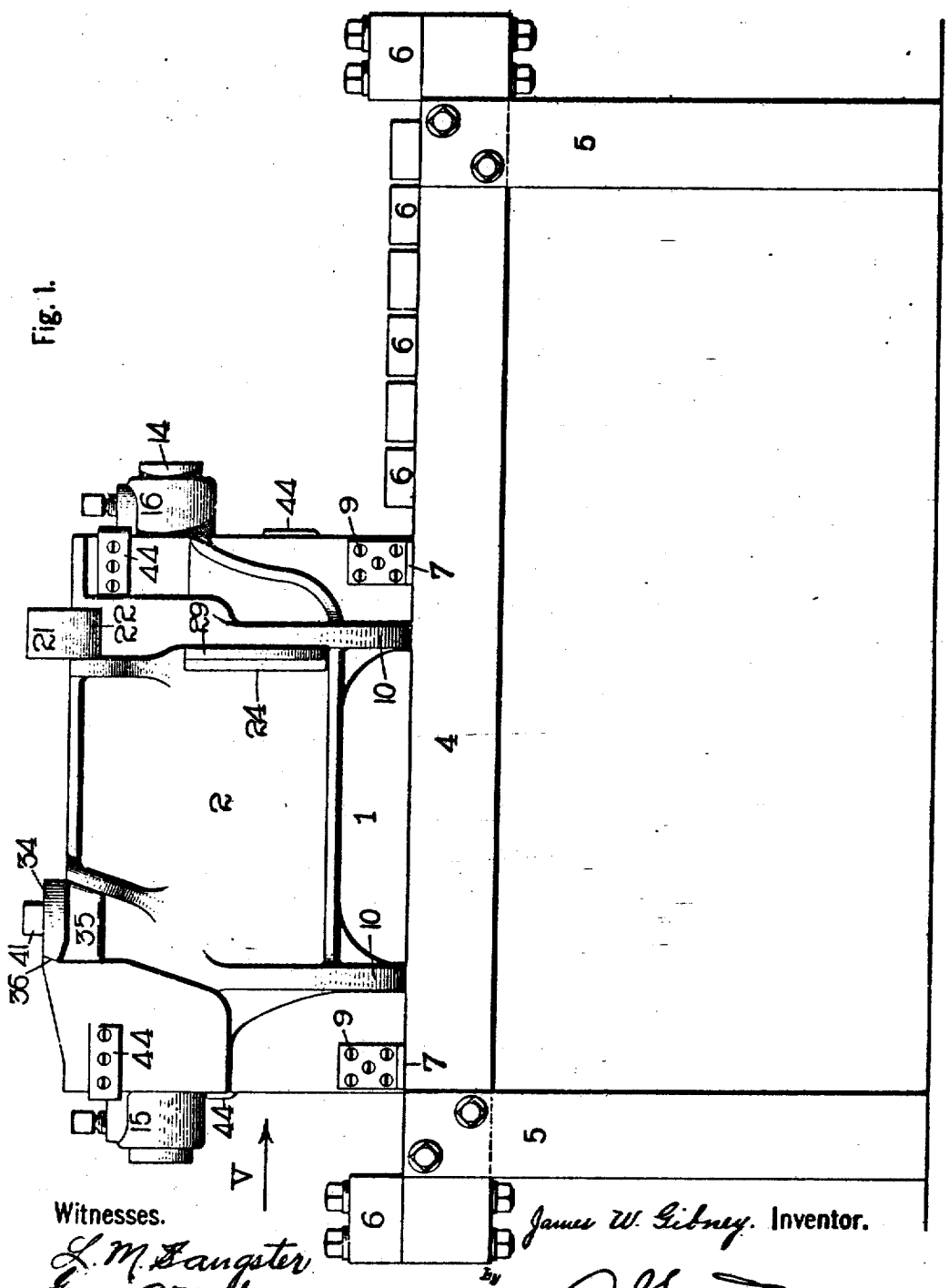

J. W. GIBNEY.
APPARATUS FOR MAKING GREEN SAND CORES.
APPLICATION FILED OCT. 5, 1907.

899,250.

Patented Sept. 22, 1908.
6 SHEETS—SHEET 1.

Witnesses.
L. M. Sangster
George A. Neubauer.

James W. Gibney. Inventor.

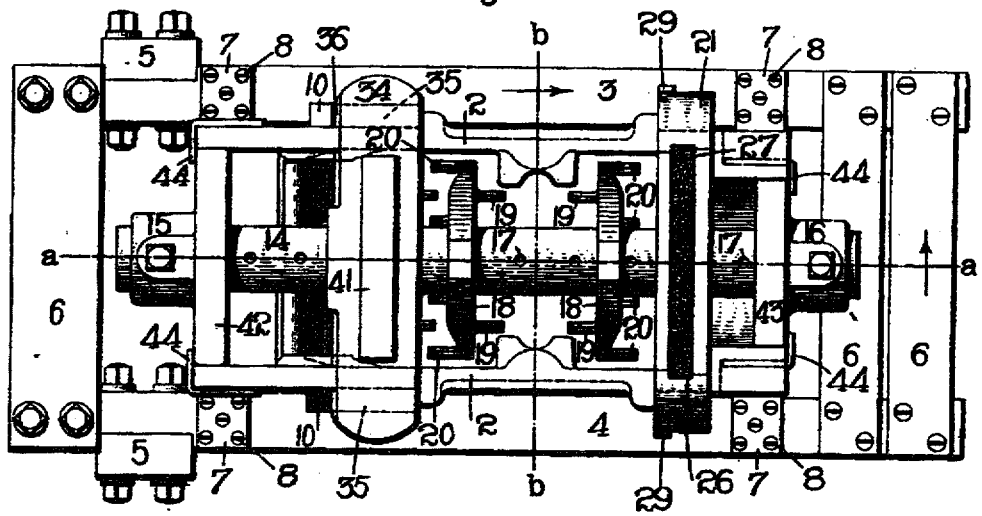
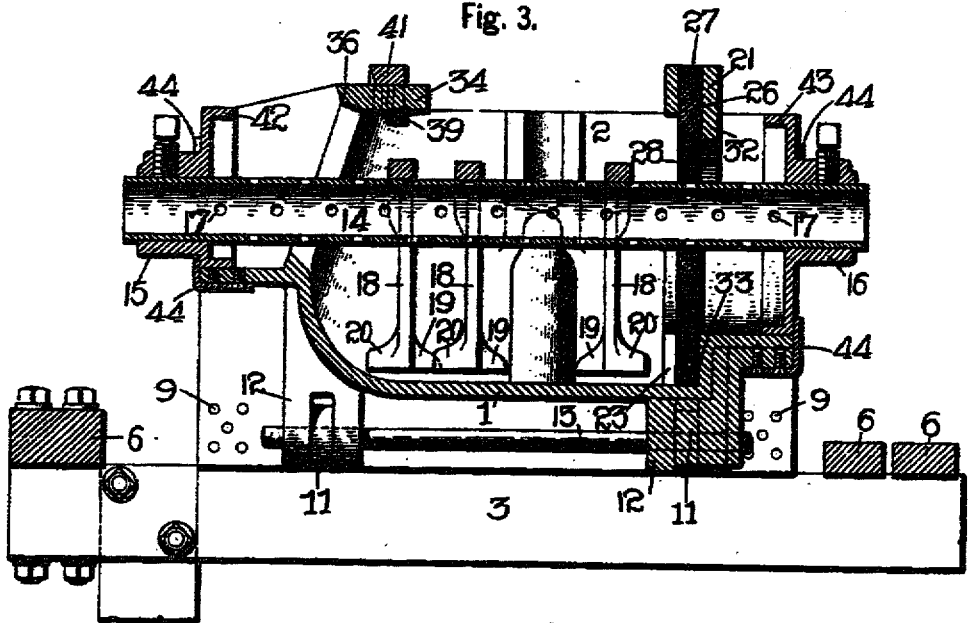

J. W. GIBNEY.
APPARATUS FOR MAKING GREEN SAND CORES.
APPLICATION FILED OCT. 5, 1907.
899,250.
Patented Sept. 22, 1908.
5 SHEETS—SHEET 3.
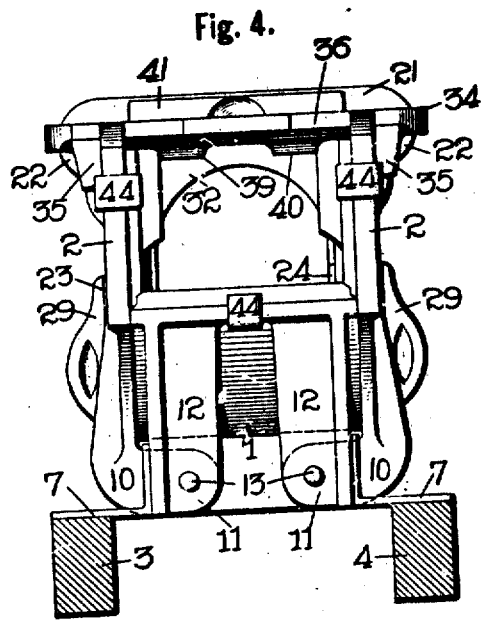
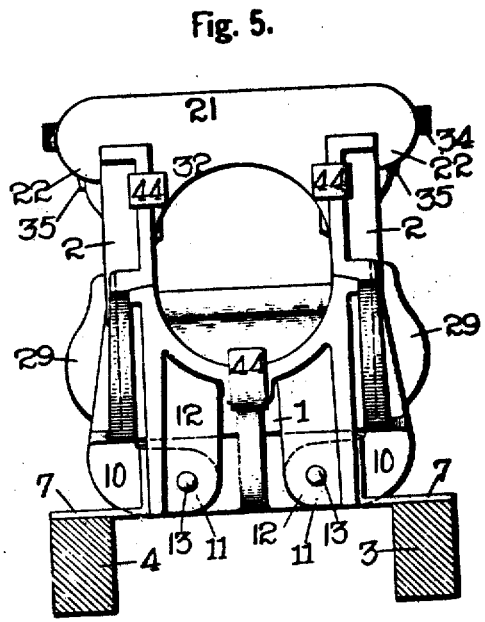
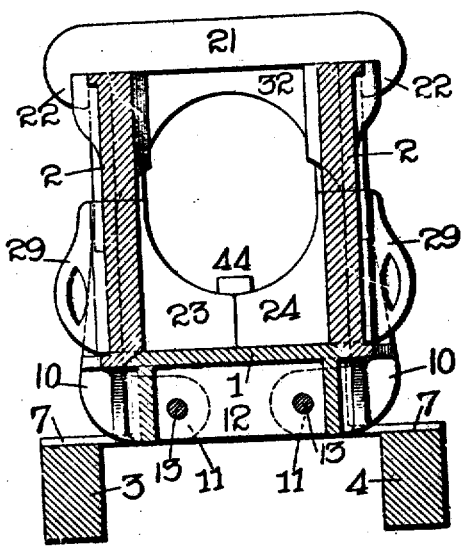
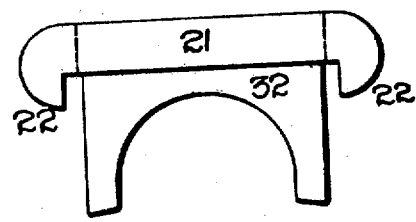
Witnesses.
L. M. Sangster.
George A. Neubauer.
James W. Gibney, Inventor.
By ... Attorney.

J. W. GIBNEY.
APPARATUS FOR MAKING GREEN SAND CORES.
APPLICATION FILED OCT. 8, 1907.
899,250.
Patented Sept. 22, 1908.
6 SHEETS—SHEET 4.
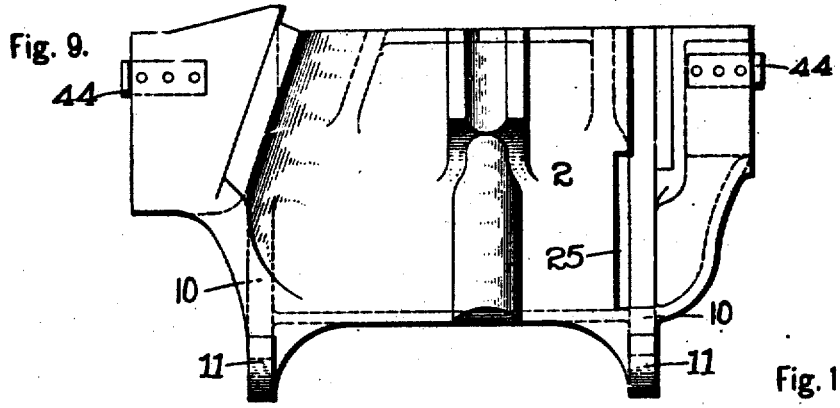
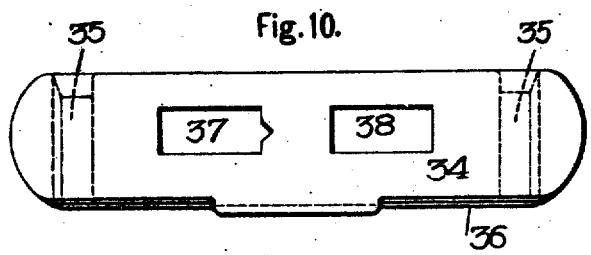
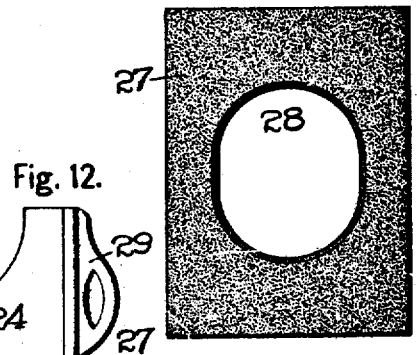
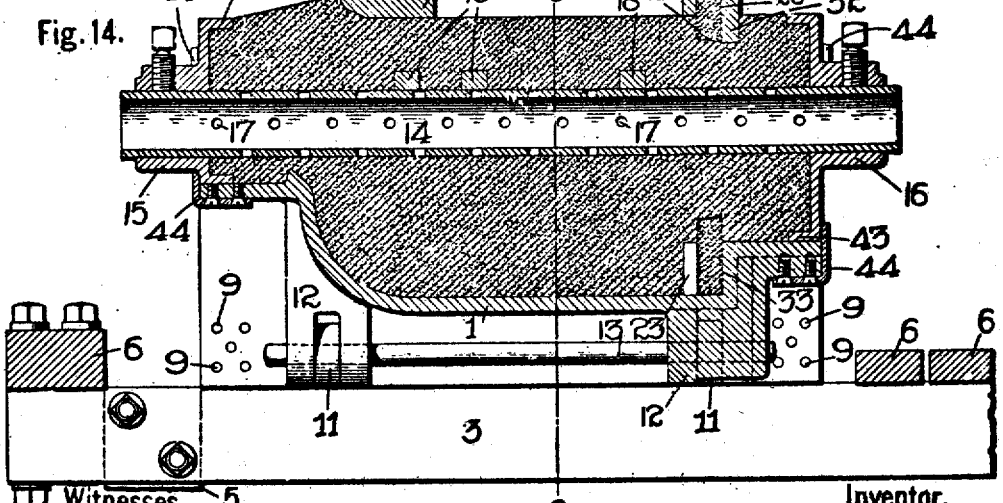

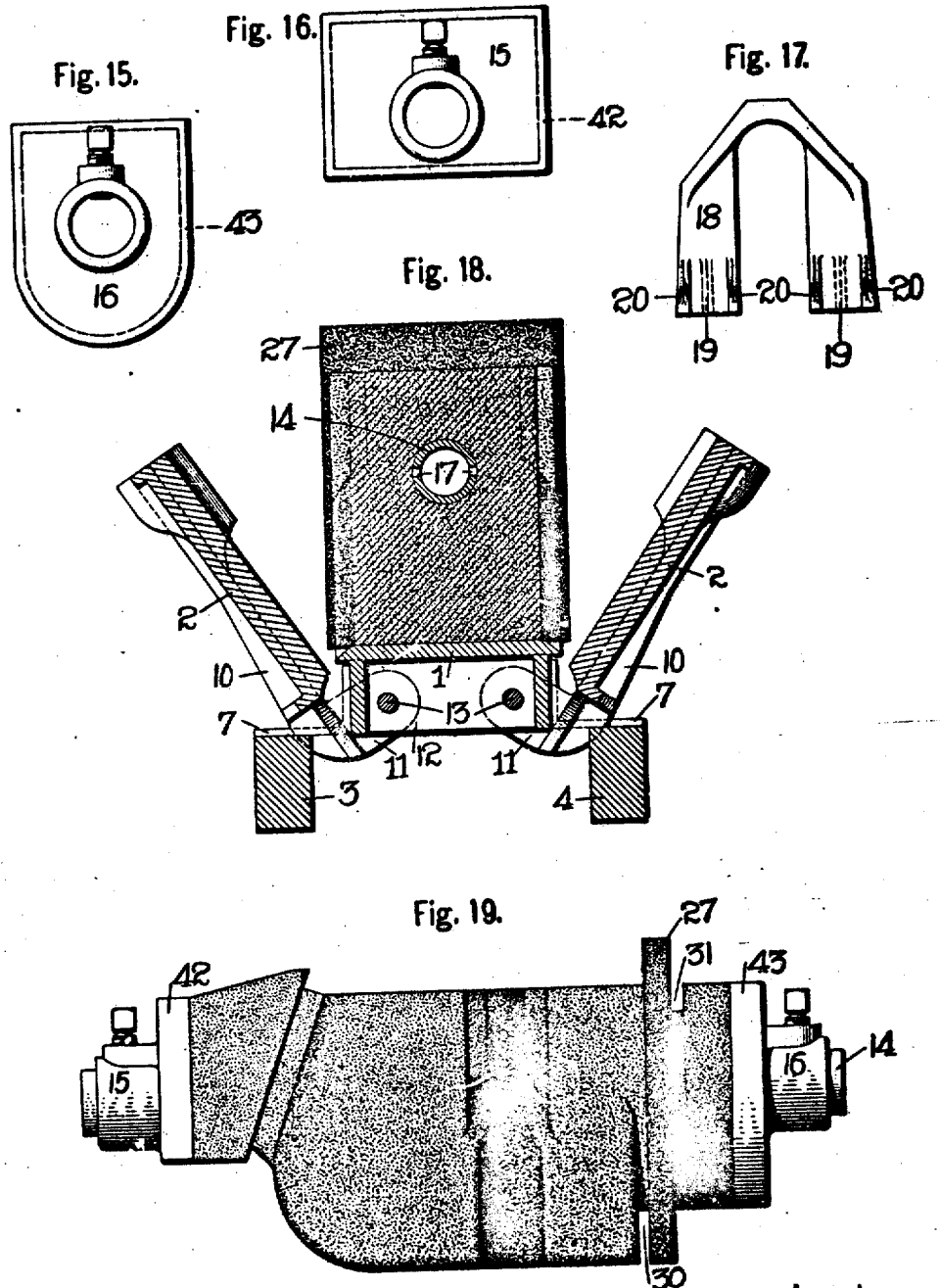

UNITED STATES PATENT OFFICE.

JAMES W. GIBNEY, OF BUFFALO, NEW YORK, ASSIGNOR TO W. P. TAYLOR COMPANY, OF BUFFALO, NEW YORK, A CORPORATION OF NEW YORK.

APPARATUS FOR MAKING GREEN-SAND CORES.

No. 899,250.  Specification of Letters Patent.  Patented Sept. 22, 1908.

Application filed October 5, 1907. Serial No. 396,097.

*To all whom it may concern:*

Be it known that I, JAMES W. GIBNEY, a citizen of the United States, residing at Buffalo, in the county of Erie and State of New York, have invented a certain new and useful Improved Apparatus for Making Green-Sand Cores, of which the following is a specification.

This invention relates to an improved apparatus for preparing molds for metal castings and more especially to the construction of the cores for multi-part molds employed in casting car journal boxes and similar devices.

The principal objects of the invention are to simplify the construction of apparatus of this character and to strengthen and stiffen the core.

This invention also relates to certain details of construction of the apparatus and the mold or core, all of which will be fully and clearly hereinafter described and claimed reference being had to the accompanying drawings in which a preferred adaptation of the apparatus and core are illustrated.

Figure 1 is a side elevation of the apparatus complete mounted upon a suitable support or table. Fig. 2 is a top plan view of the apparatus and support shown in Fig 1, a portion of one end of the table being broken away, the apparatus being in condition to have the sand introduced therein. Fig. 3 is a vertical central longitudinal section on line *a a*, Fig. 2. Fig. 4 is an end elevation of the improved apparatus, looking in the direction of the arrow V Fig. 1, a cross section being shown through the supporting table. Fig. 5 is an end elevation of the improved apparatus looking in the direction opposite to the arrow V, Fig. 1, a cross section being shown through the supporting table. Fig. 6 is a cross section on line *b b*, Fig. 2. Figs. 7 and 8 are detached side and bottom views of the sectional metal frame. Fig. 9 is a detached inner view of one of the hinged sides of the core box. Fig. 10 is an enlarged detached top plan view of the horizontal locking piece. Fig. 11 is an enlarged detached front elevation of the metal insert which is supported by the horizontal locking piece. Fig. 12 is a detached view of one of the metal forming pieces. Fig. 13 is a detached view of the perforated sand plate. Fig. 14 is a central vertical longitudinal section through the improved apparatus on line *a a*, Fig. 2, showing the core complete. Figs. 15 and 16 are detached outside views of the end plates carried by the arbor. Fig. 17 is a detached view of one of the anchors. Fig. 18 is a transverse vertical section on line *c c*, Fig. 14, showing the sides swung outwardly, so as to permit the removal of the core. Fig. 19 is a side view of the complete core.

In referring to the drawings in detail, like numerals designate like parts.

The apparatus consists broadly of a base 1, sides 2, which are hinged to the base, end pieces and transverse top members for fastening the sides in their closed operative position. A support or skeleton table consisting of two parallel side beams 3 and 4, mounted on legs 5, and connected by transverse beams 6, is preferably employed to support the apparatus. The base is fastened upon the support or table by brackets 7, which are secured respectively to the side beams 3 and 4 of the table and the base by screws 8 and 9, see Figs. 1 and 2. The top surface of the base conforms in contour to the bottom portion of the core to be made and this constitutes the bottom portion of the pattern.

The sides 2, are formed substantially as shown in Fig. 9, with their inner surfaces conforming to the contour of the sides of the core for which they form a pattern, and are each provided on their outer surfaces with vertical enlargements 10, which bend at the bottom and extend inwardly forming at the bottom laterally extending approximately horizontal lugs 11. These lugs are provided with eye openings and constitute one member of a hinge for connecting the sides to the base. The other member of each hinge consists of a depending forked portion 12, projecting downward from the under surface of the base between the forks of which the lug 11, is pivoted by a pivot pin, which passes through the eye opening in the lug 11, and similar eye openings in the forks.

In the present construction illustrated, each side is hinged by two separate hinges located near the lower corners thereof and a single long pivot pin 13, is extended through the eye openings in both hinges, see Figs. 14 and 18, for the best views of this construction.

The side beams 3 and 4, are so spaced apart and the apparatus is so located thereon that the sides when opened to a certain point are supported and rest against the side beams substantially as shown in Fig. 18. By this means the sides are limited in their opening movement and cannot swing down so as to bring undue strain upon the hinges tending to break the same.

Owing to the sides being hinged beneath the base and fairly near the center thereof, the sides need to swing open but a short distance to completely free themselves from the core as shown in Fig. 18.

The core made by this apparatus is of a built up character and consists in part of green sand, in part of dry sand and in part of metal reinforcing and supporting parts.

A core arbor consisting of a tubular body 14, and two metal end pieces 15 and 16, is seated upon the base and forms a portion of the apparatus while the core is being made and a portion of the completed core when it is finished and removed from the apparatus. The end pieces 15 and 16, are fastened upon the ends of the body 14, by set screws and form the ends of the apparatus when in place therein and the ends of the core when completed. The tubular body 14, is perforated at intervals with openings 17, see Figs. 2, 3, 14, and 18, to provide outlets for the air which is forced out of the green sand during the ramming or compressing thereof. The tubular body in fact constitutes the backbone of the core, as shown in Fig. 14, and a series of inverted substantially U shaped metal pieces 18, are hung at intervals upon the arbor and form strengthening ribs for the core. These ribs are formed substantially as shown in Figs. 2, 3 and 17, and have oppositely extending fins 19 and 20, which embed themselves in the green sand and serve both to anchor the ribs therein and to stiffen and strengthen the green sand core.

A vertical metal frame is arranged transversely in the core and consists of an upper member 21, provided with depending end lugs 22, which are adapted to fit over and assist in locking the sides in their closed position and two lower inserts 23 and 24, which are fitted through vertical slots 25, shown in Fig. 9. The upper member 21, is formed as shown in Figs. 7 and 8, and has a long vertical slot 26, in which the upper portion of a dry sand plate 27, is supported, see Figs. 2, 3 and 14. The plate 27, is shaped as shown in Fig. 13, being rectangular in outline and having an oblong central opening 28, which is tapered slightly as shown in Fig. 3. The inserts 23 and 24, are shaped as shown in Fig. 12, having a curved inner surface and a convenient projecting finger piece 29, and are fitted horizontally through the slots 25, so as to form the lower groove 30, of the core, see Fig. 19. The upper groove 31, is formed by the depending portion 32, of the member 21. The lower portion of the plate is supported between a vertical shoulder 33, formed on the base and the inserts 23 and 24, see Figs. 3 and 14.

The sides are locked in place not only by the lugs of the metal frame but also by a transverse horizontal locking piece 34, which forms a bridge that extends across between the sides and has depending lugs 35, which project down and fit over the edges of the sides. The locking piece 34, has one of its edges beveled at 36, as shown in Figs. 3, 10 and 14, to form the top portion of the lid seat of the box body so that the entire lid seat is formed completely by the core. The great advantage of this is that the surface of the seat in the completed casting is even and flat and constitutes a perfect seat for the lid. The locking piece 34, has two oblong vertical slots 37 and 38 through which the depending portions 39 and 40, of a top insert 41, project.

The end pieces of the arbor are respectively provided with lateral flanges 42 and 43, which extend completely around the outer margins thereof and constitute surrounding and projecting metal edges for the green sand ends of the core, see Fig. 14.

The base 1 and 2 sides are each provided with projecting fingers or lugs 44 at their end edges, which serve to support the end pieces 15 and 16 against end movement when the arbor is in place within the box, see Figs. 2, 3, and 14.

In making a core with this improved apparatus the hinged sides 2 are swung into a vertical position and retained in place by the transverse locking piece 34. The vertical metal frame piece 21, is then inserted in the core box so that its depending lugs 22 fit upon the outer surfaces of the side 2, thereby assisting the transverse locking piece 34 in maintaining the hinged sides in an upright position. The two lower inserts 23 and 24 are then inserted in the openings 25 in the hinged sides and the top insert 41 placed in position in the transverse locking piece. The perforated dry sand plate 27 is now inserted in the vertical slot or opening 26 in the vertical metal frame piece 21, and pushed down between the inserts 23 and 24 and the shoulder 33 until its bottom edge rests upon the top surface of the base 1, see Fig. 3. The end plate 16 which is detached from the tubular body 14, is placed in position in the end of the core box, being supported upon the base 1, and held against displacement by the projecting fingers 44. The tubular body 14 of the arbor is now inserted in the core box from the opposite end so that the end thereof passes through the opening 28 in the dry sand plate 27, and into the opening in the end plate 16 where it is secured by the set screw, see Figs. 3 and 14. By referring to the drawings it will be seen that the end plates 15 and 16 seat snugly against the projecting fingers so that all endwise movement of the core arbor is absolutely prevented. The anchors or inverted U-shaped members 18 are now hung upon the arbor body 14, in about the positions shown in Fig. 3. The apparatus is now filled with green sand which is tamped or compressed by the molder in the usual manner to form a mold. The core being completed, the lower inserts are drawn horizontally out of the slots in the sides, the upper insert is drawn vertically up from the transverse locking piece, the transverse locking piece is lifted on an incline parallel with the incline of the core surface which forms the lid seat, and the upper member of the vertical frame is lifted vertically up to entirely relieve the sides which are then turned into the position shown in Fig. 18. The completed core is now ready to be removed by the workman.

The chief advantages of this invention reside in the manner of strengthening and stiffening the core both internally and at its ends, the formation of the lid seat completely upon the core and the multipart construction of the metal frame for the dry sand plate which enables it to be easily and quickly inserted in place or withdrawn.

I claim as my invention.

1. In an improved apparatus of the class described, a base shaped in contour to form a pattern for the lower portion of the core, sides hinged to the base and shaped in contour to form a pattern for the sides of the core and a transverse locking piece for positively securing the sides in closed position; said locking piece also constituting a pattern for the upper portion of the lid seat, whereby the lid seat is formed completely with the core, substantially as set forth.

2. In an improved apparatus of the class described, a base shaped in contour to form a pattern for the lower portion of the core, sides hinged to the base and shaped in contour to form a pattern for the sides of the core and a transverse locking piece for positively securing the sides in closed position; said locking piece having a beveled edge forming a pattern for the upper portion of the lid seat, substantially as set forth.

3. In an apparatus of the class described, a base and movable sides shaped to constitute a pattern for the bottom and sides of the core and to form the lower portion and sides of the lid seat and an upper element mounted on the sides and consisting of a narrow transverse bar shaped to form the upper portion of the lid seat, whereby the entire lid seat is formed complete with the core, substantially as set forth.

4. In an apparatus of the class described, a base and movable sides shaped to constitute a pattern for the bottom and sides of the core and to form the lower portion and sides of the lid seat and an upper element mounted on the sides and consisting of a narrow transverse bar shaped to form the upper portion of the lid seat and two depending end portions adapted to lock upon the sides.

5. In an apparatus of the class described, a base and movable sides shaped to constitute a pattern for the bottom and sides of the core and to form the lower portion and sides of the lid seat, and an arbor on the base consisting of a tubular body adapted to form the backbone of the core, loosely swinging ribs hung at intervals on the tubular body and metal end pieces adapted to constitute the core ends.

6. In an apparatus of the class described, a base and movable sides adapted to constitute a pattern for the bottom and sides and an arbor on the base consisting of a tubular body adapted to form the back bone of the core, loosely swinging inverted U shaped ribs hung at intervals on the tubular body and metal end pieces adapted to constitute the core ends.

7. In an apparatus of the class described, a base and movable sides shaped to constitute a pattern for the bottom and sides of the core and an arbor on the base consisting of a tubular body adapted to form the back bone of the core, loosely swinging inverted U shaped ribs hung at intervals on the tubular body and having lateral fins and metal end pieces adapted to constitute the core ends.

8. In an apparatus of the class described, a base and movable sides shaped to constitute a pattern for the bottom and sides of the core and an arbor on the base consisting of a tubular body adapted to form the back bone of the core, loosely swinging inverted U shaped ribs hung at intervals on the tubular body and having oppositely extending lateral fins and metal end pieces adapted to constitute the core ends.

9. In an apparatus of the class described, a base and movable sides shaped to constitute a pattern for the bottom and sides of the core and an arbor on the base consisting of a tubular body adapted to form the back bone of the core, loosely swinging inverted U shaped ribs hung at intervals on the tubular body and having oppositely extending lateral fins and metal end pieces adapted to constitute the core ends and having lateral flanges extending completely around the outer margin and adapted to form protecting metal edges for the green sand.

10. In an apparatus of the class described, mechanism shaped to form the sides and bottom of a core complete with the bottom portion and sides of the lid seat in combination with a transverse top bar that constitutes both a positive lock for portions of the mechanism and a pattern for the top portion of the lid seat of the core.

11. In an improved apparatus of the class described, a metal frame for a dry sand plate consisting of an upper member having depending end portions and two lower side members.

12. In an improved apparatus of the class described, a base shaped in contour to form a pattern for the lower portion of the core, sides hinged to the base and shaped in contour to form a pattern for the sides of the core, a transverse locking piece for securing the sides in closed position, and a metal frame for a dry sand plate consisting of an upper member and two lower side inserts; and said upper member having lugs for additionally locking the hinged sides in closed position.

13. In an improved apparatus of the class described, a metal frame for a dry sand plate consisting of an upper member having depending end portions and two lower side members; said members being hollow and adapted to fit around and support the dry sand plate.

14. In an improved apparatus of the class described, a base shaped in contour to form a pattern for the lower portion of the core, sides hinged to the base and shaped in contour to form a pattern for the sides of the core, a transverse locking piece for securing the sides in closed position, and a slotted metal plate for a dry sand plate consisting of a plurality of members and the upper member having lugs for positively locking the hinged sides in closed position.

JAMES W. GIBNEY.

Witnesses:
L. M. SANGSTER,
GEORGE A. NEUBAUER.